(12) United States Patent
Kim et al.

(10) Patent No.: US 11,677,787 B2
(45) Date of Patent: Jun. 13, 2023

(54) METHOD, SYSTEM, AND NON-TRANSITORY COMPUTER READABLE RECORDING MEDIUM FOR PRECISE USER TRACKING

(71) Applicant: NAVER CORPORATION, Seongnam-si (KR)

(72) Inventors: Youngjin Kim, Seongnam-si (KR); Moweon Lee, Seongnam-si (KR)

(73) Assignee: NAVER CORPORATION, Seongnam-si (KR)

( * ) Notice: Subject to any disclaimer, the term of this patent is extended or adjusted under 35 U.S.C. 154(b) by 279 days.

(21) Appl. No.: 17/168,575

(22) Filed: Feb. 5, 2021

(65) Prior Publication Data
US 2021/0243229 A1    Aug. 5, 2021

(30) Foreign Application Priority Data
Feb. 5, 2020   (KR) .................. 10-2020-0013748

(51) Int. Cl.
*H04L 9/40*    (2022.01)
*H04L 43/0876* (2022.01)

(52) U.S. Cl.
CPC .......... *H04L 63/20* (2013.01); *H04L 43/0876* (2013.01); *H04L 63/166* (2013.01)

(58) Field of Classification Search
CPC .... H04L 63/20; H04L 43/0876; H04L 63/166
See application file for complete search history.

(56) References Cited

U.S. PATENT DOCUMENTS

| | | | | |
|---|---|---|---|---|
| 8,412,838 B1* | 4/2013 | Wang | ...................... | H04L 12/66 713/153 |
| 8,806,011 B1* | 8/2014 | Graham-Cumming | ...................... | H04L 67/02 709/227 |
| 2003/0039212 A1* | 2/2003 | Lloyd | ...................... | H04L 45/38 370/252 |
| 2008/0089241 A1* | 4/2008 | Lloyd | ...................... | H04L 47/11 370/253 |
| 2010/0218112 A1* | 8/2010 | Park | ...................... | G06Q 30/02 715/745 |
| 2019/0190960 A1* | 6/2019 | Amro | ...................... | H04L 63/30 |

FOREIGN PATENT DOCUMENTS

KR   1020020088253 A   11/2002
KR   1020100095208 A    8/2010

OTHER PUBLICATIONS

Wikipedia (HTTP cookie, Jan. 17, 2020, 26 pages) (Year: 2020).*
K. Boda et al., User Tracking on the Web via Cross-Browser Fingerprinting, 16th Nordic Conference on Secure IT Systems, p. 31-46 (Oct. 26, 2011).

* cited by examiner

*Primary Examiner* — Oleg Korsak
(74) *Attorney, Agent, or Firm* — Greer Burns & Crain Ltd.

(57) ABSTRACT

A user tracking method includes collecting cookies in a log according to a user action on the Internet and collecting chain information by Internet communication as third information different from the cookie, and grouping cookies based on the chain information.

17 Claims, 16 Drawing Sheets

FIG. 7

| Parameters | Used features |
|---|---|
| TLS Parameters (710) | TLS Version<br>Accepted ciphers list<br>List of available extensions |
| TCP Parameters (720) | IP Address<br>MSS(Maximum Segment Size): MTU |
| HTTP Header (730) | UserAgent<br>HTTP Header accept field |
| Client JS collection information (740) | Platform information<br>Language information |
| ... | ... |

FIG. 16

| Cookie (161) | User ID (162) | User ID & chain (163) | White cookie (164) | Chain (165) |
|---|---|---|---|---|
| Cookie - 1 | 👤 | | COOKIES | |
| Cookie - 2 | | | COOKIES | |
| Cookie - 3 | 👤 | 👤⬭ | | |
| Cookie - 4 | | | | ⬭ |
| Cookie - 5 | 👤 | 👤⬭ | | |
| Cookie - 6 | | | | ⬭ |
| Cookie - 7 | | | | ⬭ |
| Cookie - 8 | 👤 | | | ⬭ |

METHOD, SYSTEM, AND NON-TRANSITORY COMPUTER READABLE RECORDING MEDIUM FOR PRECISE USER TRACKING

CROSS-REFERENCE TO RELATED APPLICATION

This U.S. non-provisional application claims the benefit of priority under 35 U.S.C. § 119 to Korean Patent Application No. 10-2020-0013748 filed on Feb. 5, 2020, in the Korean Intellectual Property Office (KIPO), the entire contents of which are incorporated herein by reference.

BACKGROUND OF THE INVENTION

Field of Invention

One or more example embodiments of the following description relate to user tracking technology.

Description of Related Art

Currently, logs are used as data for various purposes, such as optimizing the efficiency of a system or a network, recording actions of users, and investigating malicious actions.

In the case of a server computer that provides a service to a plurality of access users, a systematic log management is regulated by law. For example, logs are very usefully used in the user tracking field of tracking and analyzing user activities.

As an example of user tracking technology, Korean Patent Laid-Open Publication No. 10-2002-0088253, published on Nov. 27, 2002, describes technology for monitoring user actions on the Internet.

BRIEF SUMMARY OF THE INVENTION

One or more example embodiments provide technology for more precisely analyzing a log sequence according to the actions of a user by collecting user environment information.

One or more example embodiments provide technology for maintaining continuity of an action sequence of a user in a new environment, not in a cookie-based environment.

One or more example embodiments provide technology for tracking the same browser or the same user using third information acquirable through Internet communication as a chain that connects an action sequence of a user.

According to an aspect of at least one example embodiment, there is provided a user tracking method implemented by a computer system including at least one processor configured to execute computer-readable instructions included in a memory, the user tracking method including, by the at least one processor, collecting cookies in a log according to user actions on the Internet and collecting chain information by Internet communication as third information different from the cookies; and grouping cookies based on the chain information.

The collecting of chain information may include collecting at least one of information related to transport layer security (TLS) parameters, information related to transmission control protocol (TCP) parameters, information related to a Hypertext Transfer Protocol Secure (HTTP) header, and client information by JavaScript (JS)) that is a client-side script language through HTTP over TLS (HTTPS) communication.

The collecting of chain information may include collecting information stored through a browser local storage of a client.

The grouping of cookies may include tracking the same browser or the same user based on the cookie and the chain information.

The grouping of cookies may include tracking the same browser based on the chain information at a timing at which the cookie is changed.

The grouping of cookies may include tracking the same user using a cookie of a login environment among the grouped cookies.

The user tracking method may further include, by the at least one processor, excluding a portion of the cookies based on at least one of client access information and a cookie issuance time.

The excluding of the portion of the cookies may include merging the cookies based on at least one of a device identifier (ID) and a login ID.

The excluding of the portion of the cookies may include excluding, from a target to be grouped, a cookie having a colliding cookie issuance time collides among the cookies.

The excluding of the portion of the cookies may include excluding, from a target to be grouped, a cookie having an invariant cookie issuance time among cookies issued at different unit times.

The excluding of the portion of the cookies may include excluding, from a target to be grouped, a cookie corresponding to information stored in a database configured to manage information about an abnormal cookie among the cookies.

The excluding of the portion of the cookies may include excluding, from a target to be grouped, a unique pattern of a cookie issued by a personal mode browser among the cookies.

According to an aspect of at least one example embodiment, there is provided a non-transitory computer-readable recording medium storing instructions that, when executed by a processor, cause the processor to perform the user tracking method.

According to an aspect of at least one example embodiment, there is provided a computer system including at least one processor configured to execute computer-readable instructions included in a memory. The at least one processor includes a log collector configured to collect cookies in a log according to a user action on the Internet and to collect chain information by Internet communication as third information different from the cookies; and a sequence analyzer configured to analyze an action sequence by grouping cookies based on the chain information.

According to some example embodiments, it is possible to track the same browser or the same user using third information acquirable through Internet communication as a chain that connects an action sequence of a user.

According to some example embodiments, it is possible to clearly and accurately determine a contribution to a specific action of a user by acquiring a continuous log sequence.

According to some example embodiments, it is possible to provide a log-based rational index through more accurate aggregation results by grouping cookies using a chain.

According to some example embodiments, it is possible to detect a group of users from which abusing is suspected through a group grouped with the same chain using only a chain without using login information.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Example embodiments will be described in more detail with regard to the figures, wherein like reference numerals refer to like parts throughout the various figures unless otherwise specified, and wherein:

FIG. 7 illustrates information examples available as a chain according to an example embodiment;

FIG. 16 illustrates an index used to measure a number of users based on a cookie according to an example embodiment.

Figure 1:
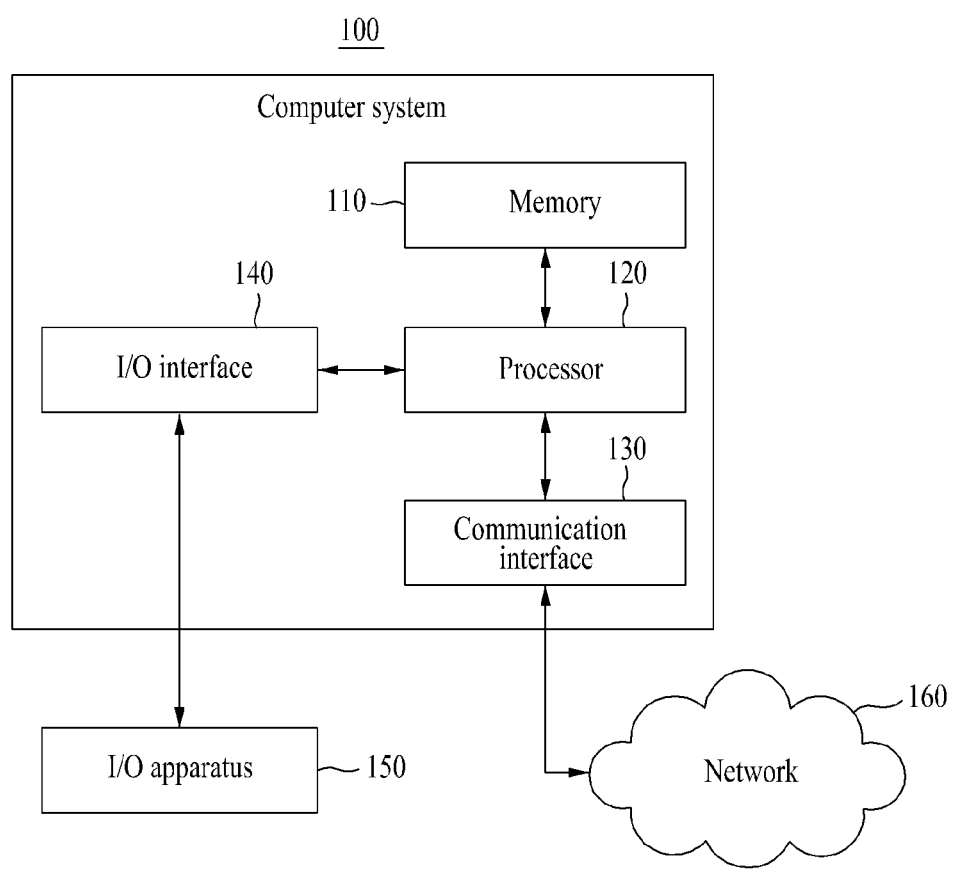
FIG. 1 illustrates a block diagram of a computer system according to an example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION OF THE INVENTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature (s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable storage mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blue-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to user tracking technology.

The example embodiments including the disclosures described herein may acquire a continuous log sequence even in a non-login situation by using third information acquirable through Internet communication for precise tracking about a user action as a chain that connects an action sequence of a user. As used herein, third information is information that is used for user tracking, and collectively refers to all information other than cookies.

FIG. 1 is a diagram illustrating a computer system according to an example embodiment. For example, a user tracking system according to example embodiments may be implemented by a computer system 100 of FIG. 1.

Referring to FIG. 1, the computer system 100 may include a memory 110, a processor 120, a communication interface 130, and an input/output (I/O) interface 140 as components for performing a user tracking method according to example embodiments.

The memory 110 may include a permanent mass storage device, such as random access memory (RAM), a read only memory (ROM), and a disk drive, as a non-transitory computer-readable storage medium. Devices such as ROM and disk drive, may be included in the computer system 100 as a permanent storage device separate from the memory 110. Also, an OS and at least one program code may be stored in the memory 110. The software components may be loaded to the memory 110 from another non-transitory computer-readable medium separate from the memory 110. The other non-transitory computer-readable storage medium may include a non-transitory computer-readable storage medium, for example, a floppy drive, a disk, a tape, a DVD/CD-ROM drive, a memory card, etc. According to other example embodiments, software components may be loaded to the memory 110 through the communication interface 130 instead of, or in addition to, the non-transitory computer-readable storage medium. For example, software components may be loaded to the memory 110 of the computer system 100 based on a computer program installed by files received over the network 160.

The processor 120 may be configured to process computer-readable instructions of a computer program by performing basic arithmetic operations, logic operations, and I/O operations. The computer-readable instructions may be provided from the memory 110 or the communication interface 130 to the processor 120. For example, the processor 120 may be configured to execute received instructions in response to the program code stored in the storage device, such as the memory 110.

The communication interface 130 may provide a function for communication between the computer system 100 and another apparatus, for example, over the network 160. For example, the processor 120 of the electronic system 100 may transfer data, a file, and a request or an instruction created based on the program code stored in the storage device, such as the memory 110, to other apparatuses over the network 160 under the control of the communication interface 130. Inversely, a signal, an instruction, data, a file, etc., from the other apparatus may be received at the computer system 100 through the communication module 130 of the computer system 100 by going through the network 160. For example, a signal, an instruction, data, etc., received through the communication interface 130 may be transferred to the processor 120 or the memory 110, and a file, etc., may be stored in a storage medium, for example, the permanent mass storage device, further includable in the computer system 100.

The communication scheme is not particularly limited and may include a communication method using a near field communication between devices as well as a communication method using a communication network, for example, a mobile communication network, the wired Internet, the wireless Internet, a broadcasting network, etc., which may be included in the network 160. For example, the network 160 may include at least one of network topologies that include, for example, a personal area network (PAN), a local area network (LAN), a campus area network (CAN), a metropolitan area network (MAN), a wide area network (WAN), a broadband network (BBN), and the Internet. Also, the network 160 may include at least one of network topologies that include a bus network, a star network, a ring network, a mesh network, a star-bus network, a tree or hierarchical network, and the like. However, it is only an example and the example embodiments are not limited thereto.

The I/O interface 140 may be a device used for interfacing with an I/O apparatus 150. For example, an input device of the I/O apparatus 150 may include a device, such as a microphone, a keyboard, a camera, a mouse, and the like, and an output device of the I/O apparatus 150 may include a device, such as a display, a speaker, and the like. As another example, the I/O interface 140 may be a device for interfacing with an apparatus in which an input function and an output function are integrated into a single function, such as a touchscreen. The I/O apparatus 150 may be configured as a single apparatus with the computer system 100.

According to other example embodiments, the computer system 100 may include a number of components greater than or less than the number of components shown in FIG. 1. For example, the computer system 100 may include at least a portion of the I/O apparatus 150, or may further include other components, for example, a transceiver, a camera, various types of sensors, a database (DB), and the like.

An action sequence of a user may be acquired based on a log for user tracking. For example, a log record based on a cookie remains in a web environment and a log record based on a device ID or a fingerprint remains in a mobile environment.

In general, by analyzing a log based on a login, an action sequence of the user may be acquired. However, the user may not maintain a login state at all times. Even in a non-login situation, a log may be analyzed based on a cookie issued from a site or a domain instead of using login information.

User tracking in a non-login situation may have the following disadvantages:

1) Demographic (demo) information, such as the age and the gender of a user, is unknown.

2) If a cookie is deleted, the cookie is reissued and thus, even the same user is recognized as a new user.

3) If a login and a non-login are repeated, it is difficult to continuously process a sequence of the same user.

Figure 2:
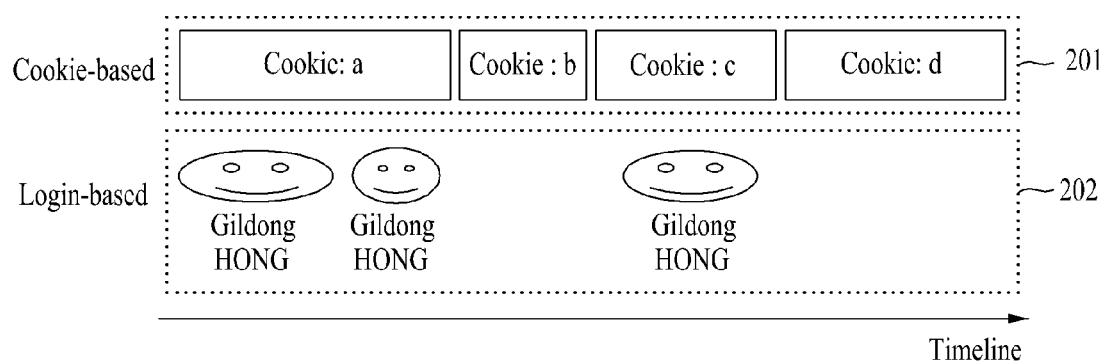
FIG. 2 illustrates a log sequence based on a user action according to an example embodiment.

FIG. 2 illustrates an example of a log sequence.

Referring to FIG. 2, a cookie-based log sequence 201 does not disclose demo information. Therefore, if four cookies are present, the four cookies may be analyzed as activities of different four users. Referring to a login-based log sequence 202, only logged-in three activities are analyzed. Although the cookie-based log sequence 201 and the login-based log sequence 202 are analyzed, sections of cookie b and cookie d do not disclose demo information or login information. Thus, analysis for user tracking may not be performed using the sections of cookie b and cookie d.

According to some example embodiments, it is possible to track the same browser or the same user using third information stored in a new environment different from a cookie environment as a chain that connects an action sequence of a user.

The example embodiments provide a system that may perform a demographic analysis of a user and may provide an action sequence of a user in a timeline without using a very robust task, such as a browser fingerprint.

Figure 3:
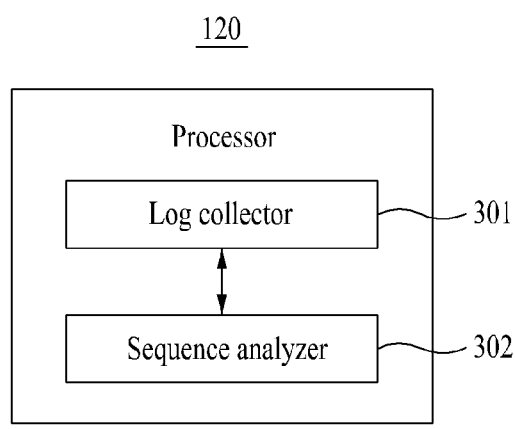
FIG. 3 is a block diagram illustrating a processor of a computer system according to an example embodiment.
Figure 4:
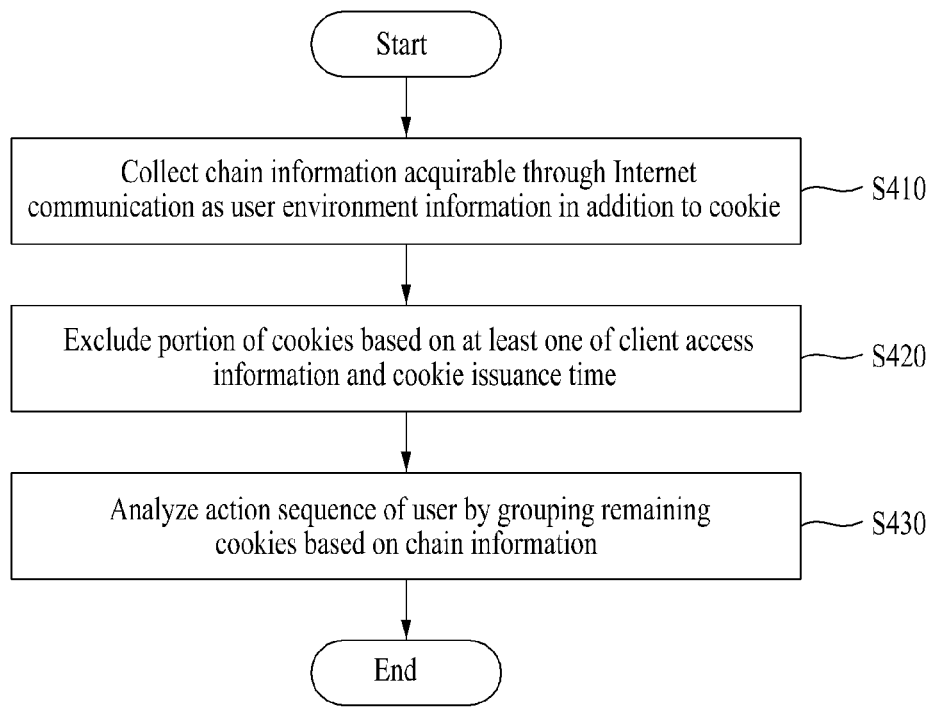
FIG. 4 is a flowchart of a user tracking method performed by a computer system according to an example embodiment.

FIG. 3 is a diagram illustrating an example of a component includable in the processor 120 of the computer system 100 according to an example embodiment, and FIG. 4 is a flowchart illustrating an example of a user tracking method performed by the computer system 100 according to an example embodiment.

Referring to FIG. 3, the processor 120 may include a log collector 301 and a sequence analyzer 302. Components of the processor 120 may be representations of different functions performed by the processor 120 in response to a control instruction provided from at least one program code. For example, the log collector 301 may be used as a functional representation that controls the computer system 100 such that the processor 120 may collect chain information acquirable with a cookie according to a log record.

The processor 120 and the components of the processor 120 may perform operations S410 to S430 included in the user tracking method of FIG. 4. For example, the processor 120 and the components of the processor 120 may be configured to execute an instruction according to at least one program code and a code of an OS included in the memory 110. Here, the at least one program code may correspond to a code of a program implemented to process the user tracking method.

The user tracking method may not be performed in the illustrated order. A portion of operations may be omitted from or an additional process may be further included in the user tracking method.

The processor 120 may load, to the memory 110, a program code stored in a program file for the user tracking method. For example, the program file for the user tracking method may be stored in a permanent storage device separate from the memory 110 and the processor 120 may control the computer system 100 such that the program code may be loaded from the program file stored in the permanent storage device to the memory 110 through a bus. Here, the processor 120 and the log collector 301 and the sequence analyzer 302 included in the processor 120 may be different functional representations of the processor 120 to perform the following operations S410 to S430 by executing an instruction of a corresponding portion in the program code loaded to the memory 110. To perform operations S410 to S430, the processor 120 and the components of the processor 120 may directly process an operation or control the computer system 100 in response to the control instruction.

Referring to FIG. 4, in operation S410, the log collector 301 may collect a cookie according to a log record about an action of a user on the Internet from a client (i.e., a computer used by the user or a program running on a user's computer) and may also collect third information excluding the cookie from chain information acquirable through Internet communication. For example, the log collector 301 may collect, as user environment information, chain information acquirable through Hypertext Transfer Protocol Secure over transport layer security (MIPS) communication in addition to the cookie.

Herein, the cookie may include any types of information capable of verifying a log, such as data or an information file capable of verifying a user log. Also, the chain information may correspond to additional information that is automatically generated in response to an Internet access aside from an MIPS cookie, as user environment information associated with Internet communication.

As described above with reference to FIG. 2, although the cookie-based log sequence 201 and the login-based log sequence 202 are analyzed together as well as individually analyzing the cookie-based log sequence 201 and the login-based log sequence 202, the continuity of the action sequence of the user may not be maintained.

That is, since a login is the intent of the user, information may be simply intermittently acquired. Although a corresponding cookie may be used to continuously maintain the information, the cookie is continuously changed and thus, the continuity may not be guaranteed.

Figure 5:
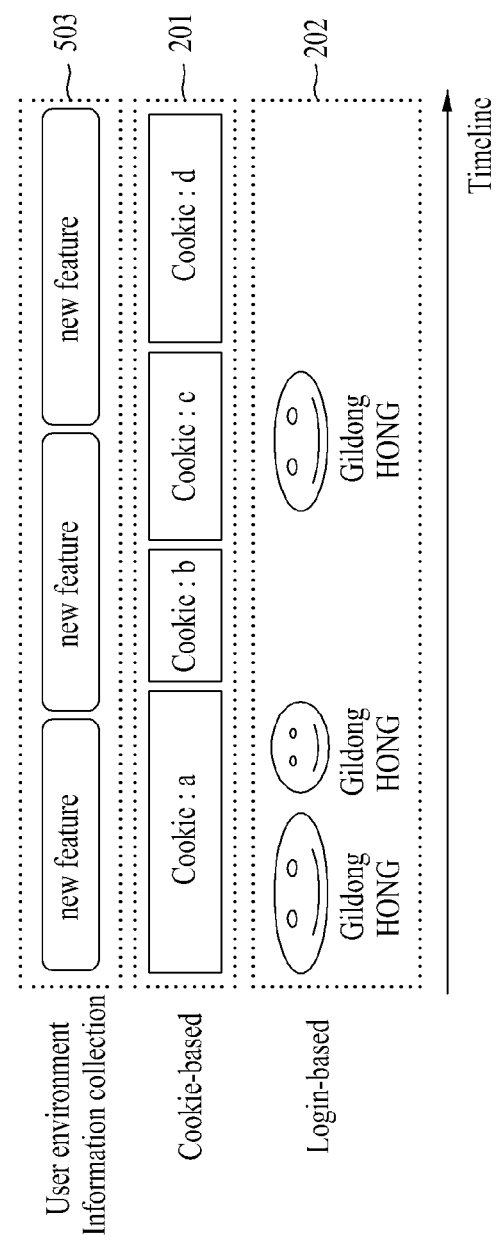
FIGS. 5 and 6 illustrate a chain capable of grouping cookies according to an example embodiment.

Referring to FIG. 5, in the case of generating a cookie-level key that connects an action sequence of a user is generated using a new feature 503 (other than cookies) acquired in not a cookie-based environment but a new environment, when a log is intermittently implemented, corresponding information may be continuously maintained even in a non-login situation and a continuous sequence may be acquired to the maximum.

Figure 6:
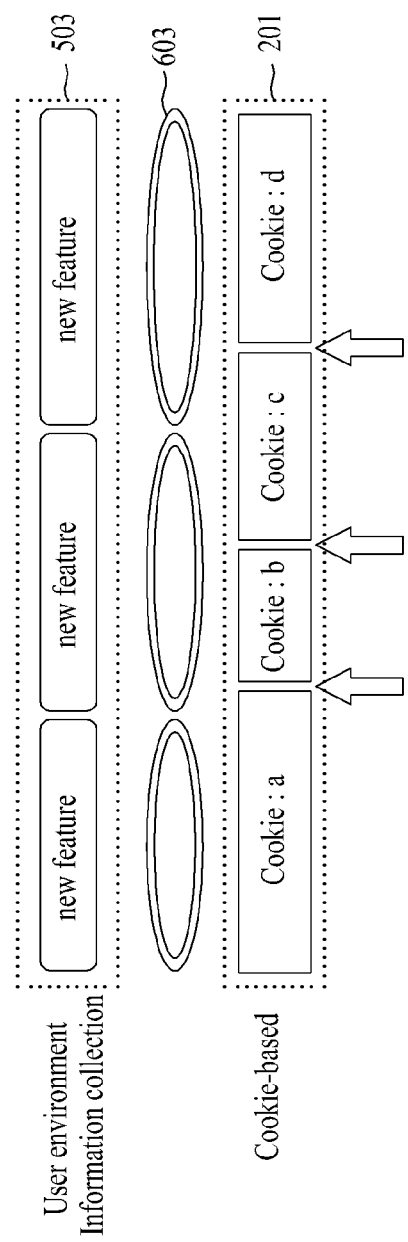

Referring to FIG. 6, if cookies are capable of being grouped using a chain 603 at a timing at which each corresponding cookie is changed (e.g., a point indicated with an arrow indicator) in the cookie-based log sequence 201, the continuity of the sequence may be guaranteed. Cookies a, b, and c may be grouped into the same browser or the same user based on a second feature among the new features 503. As described above, if a corresponding cookie is grouped using the chain 603 based on the new feature 503 at a point in time at which the cookie is changed, cookies a, b, c, and d may relate to the same browser. Here, there may be a high probability that all of the users are the same person.

Although information stored in an environment different from a cookie environment is even a single log, it does not change at the same timing and thus, is connectible like the chain 603. In other words, as information that can be used for user tracking, various features may be stored, not just cookies. Both cookies and multiple features do not change at the same time, and at least one feature changes at a time lag from the cookies, so they can be chained. Therefore, the chain 603 may be regarded to correspond to the new feature 503 stored in the environment different from the cookie environment.

In the example embodiment, the log collector 301 may collect information for a log record, such as a cookie, and may additionally collect chain information acquirable through HTTPS communication as the new feature 503 for generating the chain 603 in addition to the cookie.

FIG. 7 illustrates an example of information available as the new feature 503 for generating the chain 603.

Transport layer security (TLS) parameters 710 refer to parameters that provide authenticity, confidentiality, and integrity when forwarding a message between users and may generate a cipher suite by combining at least one encryption scheme that achieves a security goal. The TLS parameters 710 may include a TLS version, an accepted ciphers list, and a list of available extensions.

Transmission control protocol (TCP) parameters 720 refer to various setting values associated with TCP connection and include unique values for each user client. The TCP parameters 720 may include an IP address and a maximum segment size (MSS) (MTU).

An HTTP header 730 refers to an area in which a client and a server may transmit additional information as a request or a response and may include a user agent (UA) and an HTTP header accept field.

Client JavaScript (JS) collection information 740 may include platform information and language information as a variety of information of a client collectable as JS that is a client-side script language.

At least one or at least two pieces of the aforementioned chain information, for example, the TLS parameters 710, the TCP parameters 720, the HTTP header 730, and the client JS collection information 740, may be used as the new feature 503 having a role of the chain 603 for grouping cookies. In the case of simultaneously using at least two pieces of information among the chain information, for example, the TLS parameters 710, the TCP parameters 720, the HTTP header 730, and the client JS collection information 740, as individual pieces, the robust chain 603 may be acquired.

However, the chain information, for example, the TLS parameters 710, the TCP parameters 720, the HTTP header 730, and the client JS collection information 740, is provided as an example only. The more robust chain 603 may be generated by adding a variety of information based on a situation.

As another example, the log collector 301 may collect information stored through a browser local storage of a client to use as the new feature 503 for generating the chain 603. In addition to an HTTPS communication environment, a cookie value may be additionally stored through the browser local storage and may be used as the chain 603.

Referring again to FIG. 4, in operation S420, the sequence analyzer 302 may exclude a portion of cookies that are sequence analysis targets based on at least one of client access information and a cookie issuance time. The sequence analyzer 302 may analyze a log sequence with respect to a cookie issued during a unit time based on a period of a unit time, for example, 1 day, and may exclude a portion of the cookies from a target to be grouped by filtering out as a cookie of which abusing is suspected and a cookie having an invariant cookie issuance time, prior to performing a sequency analysis.

Figure 8:
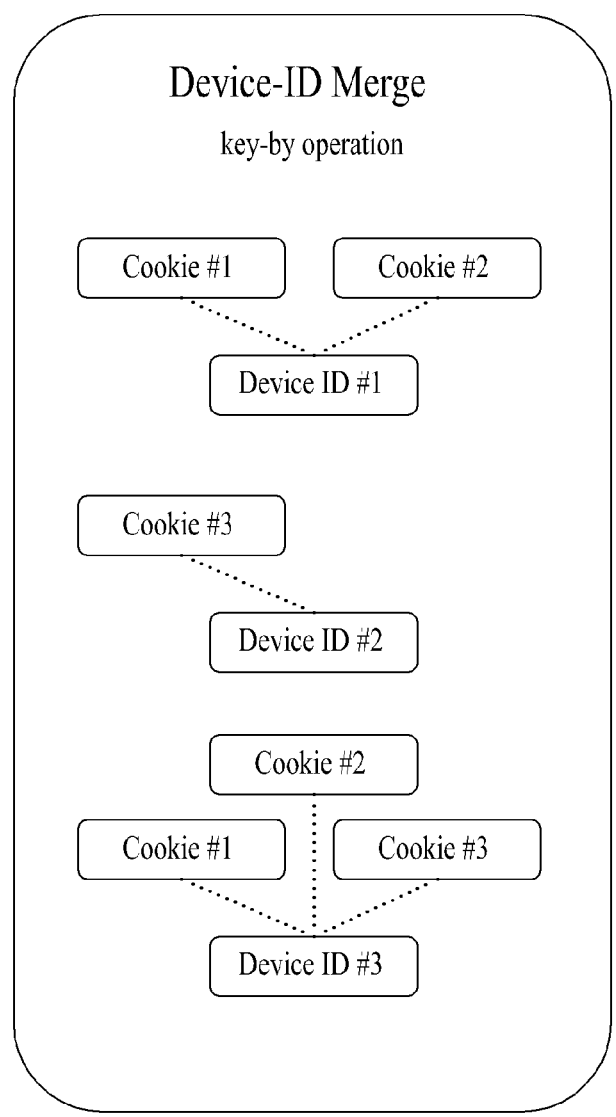
FIGS. 8 to 11 illustrate a process of filtering a cookie according to an example embodiment.

Referring to FIG. 8, the sequence analyzer 302 may collect a device ID of the client which is one example of client access information and may merge or group cookies of the same user as a sequence analysis target based on the device ID.

Figure 9:
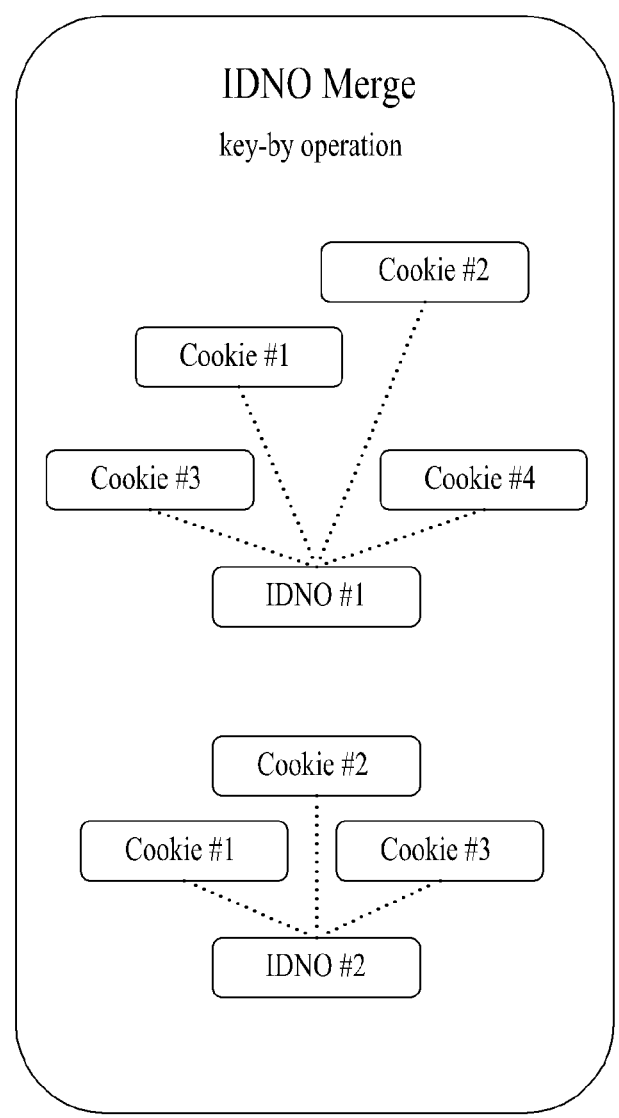

Referring to FIG. 9, the sequence analyzer 302 may collect a login ID which is another example of client access information and may merge or group cookies as a sequence analysis target based on the login ID. A login ID entered by the user when logging in may be collected from the client together with log data according to the login connection.

Figure 10:
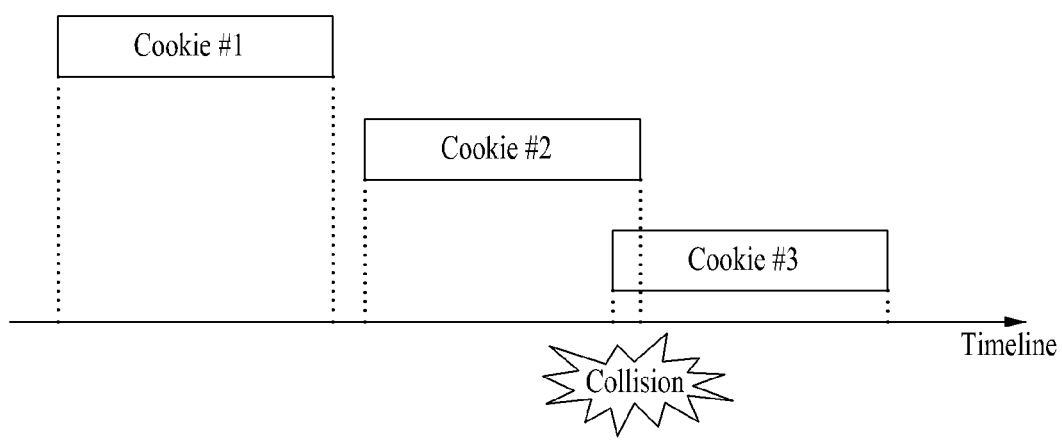

Referring to FIG. 10, the sequence analyzer 302 may exclude a portion of cookies including cookie #1, cookie #2, and cookie #3 from a sequence analysis target based on a cookie issuance time. That is, the sequence analyzer 302 may exclude cookie #3 colliding with another cookie, for example, cookie #2, due to an overlapping issuance time among cookies #1, #2, and #3 from the sequence analysis target. The sequence analyzer 302 may select cookies #1 and #2 between which a collision or an overlap of a cookie issuance time is absent as the sequence analysis target.

A cookie generated in a logically single browser excluding a PC environment burned as an image or a case with some malicious intents may not overlap cookies generated in the past. Due to such a cookie characteristic, some cookies may be classified into cookies that do not need to be grouped using a chain and may be excluded from a sequence analysis target.

Figure 11:
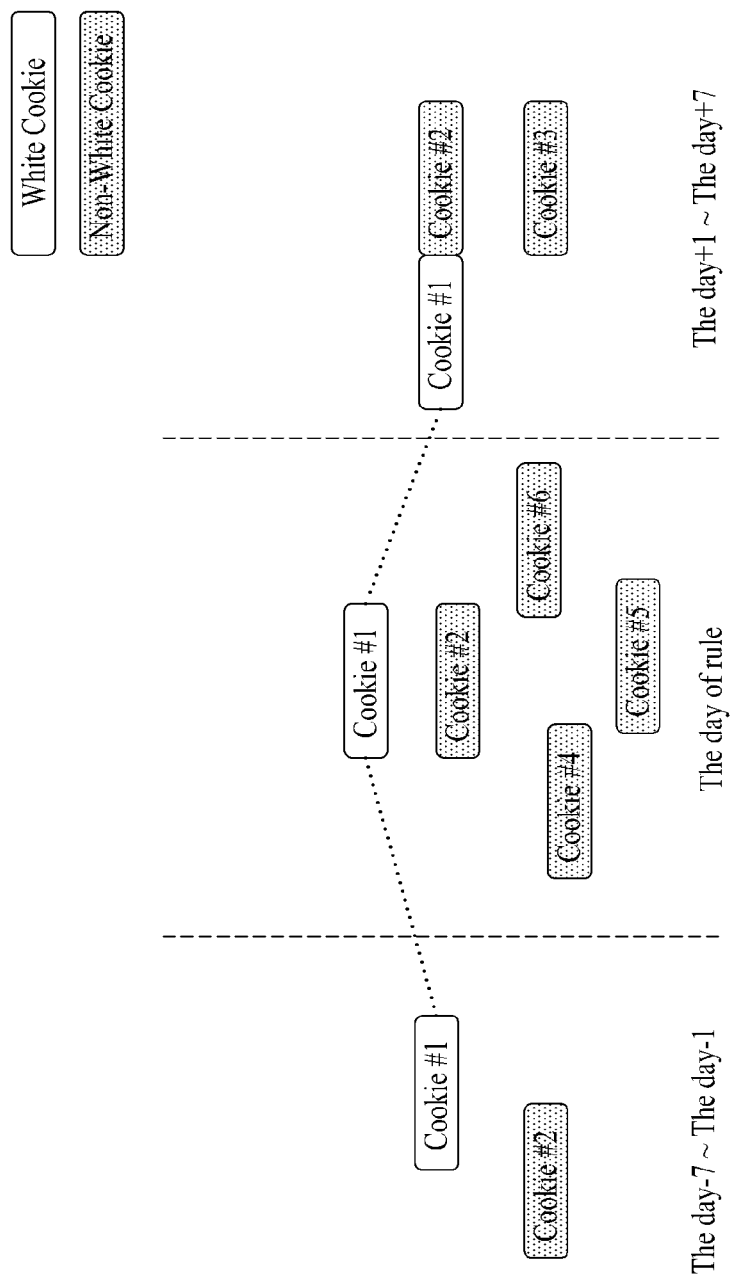

Referring to FIG. 11, the sequence analyzer 302 may track cookies issued at a previous unit time and a subsequent unit time, may select a white cookie having an invariant cookie issuance time, and may exclude the selected white cookie from the sequence analysis target. For example, among cookies collected at a specific point in time (the day of rule), cookies collected during a certain period prior to the specific point in time (e.g., specific day−7 days to specific day−1 day), and the cookies collected during a certain period after the specific point in time (e.g., specific day+1 day to specific day+7 days), the cookies whose occurrence time has not changed are classified as white cookies.

In addition to the white cookie, the sequence analyzer 302 may select a cookie corresponding to information stored in an external database configured to manage information about an abnormal cookie and may exclude the selected cookie from the sequence analysis target. Also, the sequence analyzer 302 may select a cookie having a specific pattern, for example, a unique pattern of a cookie issued by a personal mode browser, such as a secret browser, and may exclude the selected cookie from the sequence analysis target.

The sequence analyzer 302 may construct a list of merged cookies, a list of cookies having a colliding cookie issuance time, a list of cookies classified as a white cookie, and a list of cookies classified as an abnormal cookie, as a reference database, based on client access information, and may use the constructed reference database for sequence analysis.

The aforementioned cookie merging process may be performed sequentially from a more robust and highly probable cookie in cookie classification. For example, the aforementioned cookie merging process may be performed in order of merge by device-ID merge, merge by login ID, and merge by presence or absence of collision. However, it is provided as an example only and the merging order may be readily modified.

Referring again to FIG. 4, in operation S430, the sequence analyzer 302 may analyze an action sequence of the user by grouping cookies corresponding to the sequence analysis target based on the chain information collected in operation S410 as a chain for grouping cookies.

Figure 12:
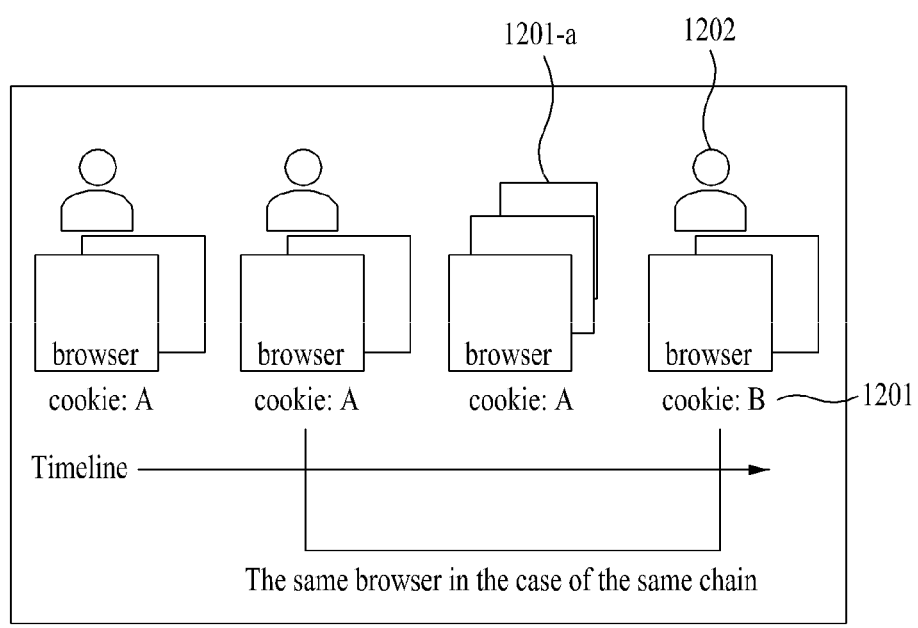
FIGS. 12 to 14 illustrate a process of grouping cookies using a chain according to an example embodiment.

Referring to FIG. 12, the sequence analyzer 302 may track the same browser and the same user based on a cookie 1201 and a user ID 1202, for example, a device ID and a login ID. Here, when the same cookie as a cookie 1201-a in a non-login environment in which the user ID 1202 is absent among the cookies 1201 on a timeline is a cookie in a login environment in which the user ID 1202 is present, the sequence analyzer 302 may determine the corresponding cookies as the same user and may group the corresponding cookies in the same group. When the chain is identical at a cookie change point in time (cookie A→B), the sequence analyzer 302 may determine the corresponding cookies as the same browser and may group the corresponding cookies in the same group.

Figure 13:
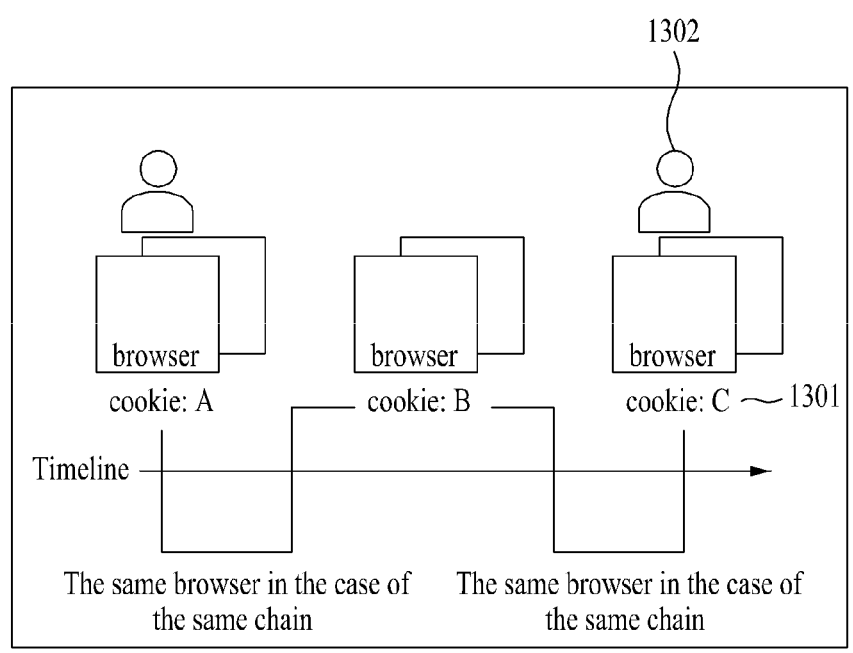

Referring to FIG. 13, the sequence analyzer 302 may track the same browser and the same user based on a cookie 1301 and a chain. Here, when the chain is identical at a cookie change point in time (cookie A→B, B→C), the sequence analyzer 302 may determine the corresponding cookies as the same browser and may group the corresponding cookies. When at least one of the grouped cookies 1301 is a cookie in a login environment in which a user ID 1302 is present, the sequence analyzer 302 may determine the corresponding cookies as the same user based on the user ID 1302.

Figure 14:
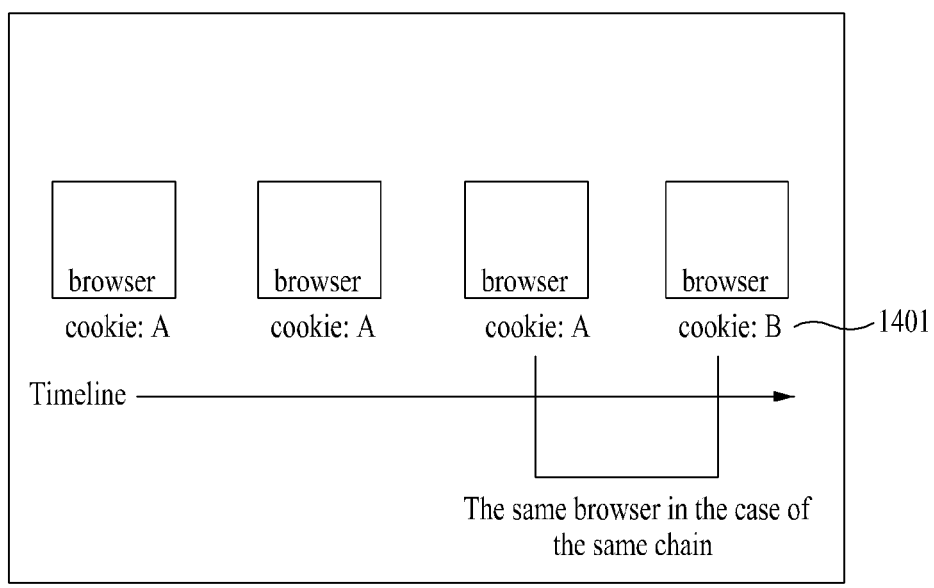

Referring to FIG. 14, the sequence analyzer 302 may track the same browser based on a cookie 1401 and a chain without considering a user ID. When a chain is identical at a cookie change point in time (cookie: A→B), the sequence analyzer 302 may determine the corresponding cookies as the same browser and may group the corresponding cookies.

Third information aside from a cookie may be used as a chain for grouping cookies. Here, the chain may be used for browser-based cookie grouping or a user ID-based cookie grouping.

Figure 15:
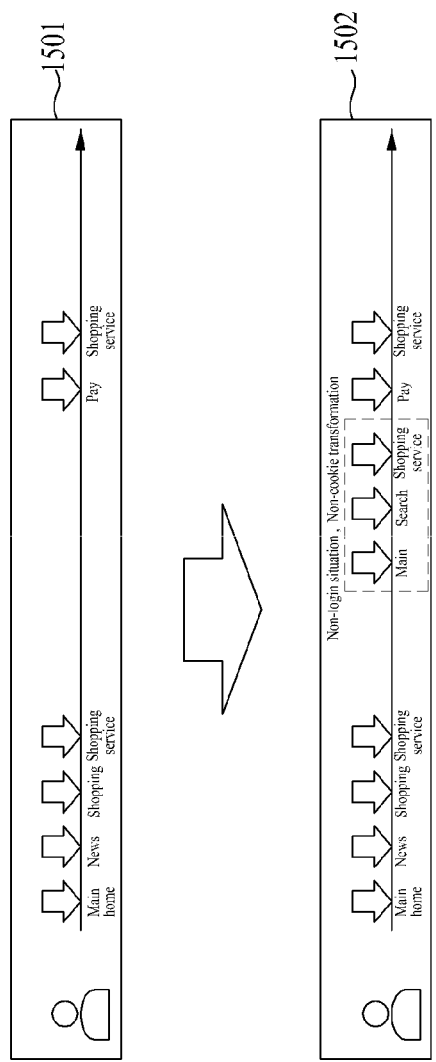
FIG. 15 illustrates an action sequence of a user using a chain according to an example embodiment.

The sequence analyzer 302 may connect a log sequence according to the actions of a user using a chain. Referring to FIG. 15, in the case of analyzing a user ID-based log sequence 1501 as a user action flow, a portion of cookies may not be connected due to a non-login situation or an environment in which a cookie change occurs. When a cookie change occurs, when different devices or browsers are used, or in a non-login environment, a continuous log sequence may be acquired by grouping the same chain of cookies using a chain.

Using a chain, an action sequence of a user may be used to determine contribution to a specific action of the user. For example, if the user performs a purchase activity, a user action path leading to the purchase activity may be clearly and accurately detected. Through this, the contribution to the purchase may be determined with high accuracy. Alternatively, the erroneously determined contribution may be corrected.

FIG. 16 illustrates examples of an index used to measure a number of users.

Referring to FIG. 16, in the case of measuring a number of users based on an index 161 using a cookie, the processor 120 may measure the number of users by counting the number of cookies each having a different key value. In the case of measuring the number of users based on an index 162 using a user ID, for example, a device ID and a login ID, the processor 120 may measure the number of users by grouping cookies by the same user ID. Also, in the case of measuring the number of users based on an index 163 using both the user ID and the chain, the processor 120 may measure the number of users by grouping cookies having the same user ID and chain. Also, in the case of measuring the number of users based on an index 164 using a white cookie, the processor 120 may measure the number of users by excluding a cookie corresponding to the white cookie among cookies and then counting the number of cookies having different key values. Also, in the case of measuring the number of users based on an index 165 using a chain, the processor 120 may measure the number of users by grouping cookies having the same chain.

According to some example embodiments, in the case of grouping cookies using a chain to measure a number of users based on a cookie, it is possible to provide more accurate aggregate results and to acquire a reasonable index for measuring the number of users.

Also, according to some example embodiments, it is possible to detect a group of users from which abusing is suspected through a group grouped with the same chain using only a chain without using login information. For example, it is possible to detect a situation suspected as an abuser, such as, for example, a case in which a cookie continuously changes in the same browser.

The systems and/or apparatuses described herein may be implemented using hardware components, software components, and/or a combination thereof. For example, hardware components may be implemented using a processing device including one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable storage mediums.

The methods according to the example embodiments may be recorded in non-transitory computer-readable recording media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of other media may include recording media and storage media managed by Appstore that distributes applications or a site, a server, and the like that supplies and distributes other various types of software. Examples of program instructions include both machine code, such as produced by a compiler, and files containing higher level code that may be executed by the computer using an interpreter.

The foregoing description has been provided for purposes of illustration and description. It is not intended to be exhaustive or to limit the disclosure. Individual elements or features of a particular example embodiment are generally not limited to that particular embodiment but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A user tracking method executed by at least one processor in a computer system, the method comprising:
   collecting cookies in a log according to a user action on the Internet and collecting chain information by Internet communication as information different from the cookies;
   excluding a portion of the collected cookies from target cookies to be grouped based on at least one of client access information and a cookie issuance time; and
   grouping the target cookies based on the chain information.

2. The user tracking method of claim 1, wherein the collecting of the chain information comprises collecting at least one of information related to transport layer security (TLS) parameters, information related to transmission control protocol (TCP) parameters, information related to a Hypertext Transfer Protocol Secure (HTTP) header, and client information by JavaScript (JS) that is a client-side script language through HTTP over TLS (HTTPS) communication.

3. The user tracking method of claim 1, wherein the collecting of the chain information comprises collecting information stored through a browser local storage of a client.

4. The user tracking method of claim 1, wherein the grouping of the target cookies comprises tracking the same browser or the same user based on the target cookies and the chain information.

5. The user tracking method of claim 1, wherein the grouping of the target cookies comprises tracking the same browser based on the chain information at a timing at which the target cookies are changed.

6. The user tracking method of claim 1, wherein the grouping of the target cookies comprises tracking the same user using the target cookies of a login environment among the grouped cookies.

7. The user tracking method of claim 1, wherein the excluding of the portion of the collected cookies comprises merging the collected cookies based on at least one of a device identifier (ID) and a login ID.

8. The user tracking method of claim 1, wherein the excluding of the portion of the collected cookies comprises excluding, from the target cookies to be grouped, a cookie having a cookie issuance time that collides with another cookie.

9. The user tracking method of claim 1, wherein the excluding of the portion of the collected cookies comprises excluding, from the target cookies to be grouped, a cookie having an invariant cookie issuance time among collected cookies issued at different unit times.

10. The user tracking method of claim 1, wherein the excluding of the portion of the collected cookies comprises excluding, from the target cookies to be grouped, a cookie corresponding to information stored in a database configured to manage information about an abnormal cookie among the collected cookies.

11. The user tracking method of claim 1, wherein the excluding of the portion of the collected cookies comprises excluding, from the target cookies to be grouped, a unique pattern of a cookie issued by a personal mode browser among the collected cookies.

12. A non-transitory computer-readable recording medium storing instructions that, when executed by a processor, cause the processor to perform the user tracking method of claim 1.

13. A computer system comprising:
   at least one processor configured to execute computer-readable instructions included in a memory,
   wherein the at least one processor comprises:
   a log collector configured to collect cookies in a log according to a user action on the Internet and to collect chain information by Internet communication as information different from the cookies; and
   a sequence analyzer configured to exclude a portion of the collected cookies from target cookies to be grouped, based on at least one of client access information and a cookie issuance time, and analyze an action sequence by grouping the target cookies based on the chain information.

14. The computer system of claim 13, wherein the chain information includes at least one of information related to transport layer security (TLS) parameters, information related to transmission control protocol (TCP) parameters, information related to a Hypertext Transfer Protocol Secure (HTTP) header, and client information by JavaScript (JS) that is a client-side script language through HTTP over TLS (HTTPS) communication.

15. The computer system of claim 13, wherein the sequence analyzer is further configured to track the same browser based on the chain information at a timing at which the target cookies are changed, or to track the same user using target cookies of a login environment among the grouped cookies.

16. The computer system of claim 13, wherein the sequence analyzer is further configured to exclude, from the target cookies to be grouped, a cookie having a colliding cookie issuance time among the cookies.

17. The computer system of claim 13, wherein the sequence analyzer is further configured to exclude, from the target cookies to be grouped, a cookie having an invariant cookie issuance time among collected cookies issued at different unit times.

* * * * *